(12) United States Patent
Hsu et al.

(10) Patent No.: US 11,065,706 B2
(45) Date of Patent: Jul. 20, 2021

(54) HYBRID MANUAL AND AUTOMATED WELDING

(71) Applicant: ILLINOIS TOOL WORKS INC., Glenview, IL (US)

(72) Inventors: Christopher Hsu, Appleton, WI (US); Dennis Sigl, Greenville, WI (US); Herbert A. Bankstahl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 103 days.

(21) Appl. No.: 15/248,084

(22) Filed: Aug. 26, 2016

(65) Prior Publication Data

US 2017/0057000 A1 Mar. 2, 2017

Related U.S. Application Data

(60) Provisional application No. 62/211,685, filed on Aug. 28, 2015.

(51) Int. Cl.
*B23K 9/28* (2006.01)
*B23K 9/12* (2006.01)
(Continued)

(52) U.S. Cl.
CPC ............... *B23K 9/122* (2013.01); *B23K 9/02* (2013.01); *B23K 9/0206* (2013.01); *B23K 9/095* (2013.01);
(Continued)

(58) Field of Classification Search
CPC ...... B23K 9/02; B23K 9/0206; B23K 9/0216; B23K 9/0256; B23K 9/095; B23K 9/0956;
(Continued)

(56) References Cited

U.S. PATENT DOCUMENTS 4,019,016 A * 4/1977 Friedman ............. B23K 9/0216
219/125.12
4,022,068 A * 5/1977 Slavens .................... B23K 9/30
74/54

(Continued)

FOREIGN PATENT DOCUMENTS

WO     2009/037280 A1    3/2009
WO  WO 2009/037280 A1 *  3/2009  ......... B23K 37/0205
WO     2013/008235 A2    1/2013

OTHER PUBLICATIONS

PCT, Notification of Transmittal of the International Search Report and the Written Opinion of the International Searching Authority, or the Declaration, Application No. PCT/US2016/048917, dated Oct. 24, 2016 (12 pages).

(Continued)

*Primary Examiner* — Hung D Nguyen
(74) *Attorney, Agent, or Firm* — McAndrews, Held & Malloy, Ltd

(57) ABSTRACT

Hybrid manual and automated welding systems and methods are described. A hand-held welding tool is manually positioned to engage a workpiece. A weld is started from an initial position based on a first manual operator event. A welding heat source is automatically or autonomously moved along the weld relative to the workpiece from the first position to a second position relative to the workpiece during welding.

38 Claims, 12 Drawing Sheets

(51) Int. Cl.
*B23K 9/02* (2006.01)
*B23K 37/02* (2006.01)
*B23K 9/095* (2006.01)

(52) U.S. Cl.
CPC ............ *B23K 9/12* (2013.01); *B23K 37/0205* (2013.01); *B23K 37/0264* (2013.01)

(58) Field of Classification Search
CPC .......... B23K 9/12; B23K 9/122; B23K 9/126; B23K 9/1274; B23K 9/1276; B23K 37/02; B23K 37/0205; B23K 37/0267
USPC ....... 219/136, 137 R, 137.2, 137.31, 137.43, 219/137.7, 139, 144
See application file for complete search history.

(56) References Cited

U.S. PATENT DOCUMENTS

| | | | | |
|---|---|---|---|---|
| 4,131,783 | A | | 12/1978 | Kensrue |
| 4,401,878 | A | * | 8/1983 | Roen .................. B23K 9/30 219/137.31 |
| 4,801,780 | A | * | 1/1989 | Hayes .................. B23K 9/1336 219/130.1 |
| 4,839,490 | A | * | 6/1989 | DeSaw .................. B23K 9/02 219/137.31 |
| 6,259,059 | B1 | * | 7/2001 | Hsu .................. B23K 9/0735 219/130.31 |
| 2013/0001210 | A1 | * | 1/2013 | Pagano .................. B23K 9/173 219/137 R |
| 2013/0256287 | A1 | | 10/2013 | Cole |
| 2014/0144896 | A1 | * | 5/2014 | Einav .................. B23K 9/126 219/124.1 |
| 2015/0076119 | A1 | * | 3/2015 | Hsu .................. B23K 9/0956 219/74 |
| 2015/0190878 | A1 | * | 7/2015 | Roen .................. B23K 9/0216 219/138 |

OTHER PUBLICATIONS

PCT, Notification Concerning Transmittal of International Preliminary Report on Patentability, in application No. PCT/US2016/048917, dated Mar. 15, 2018 (8 pages).

* cited by examiner

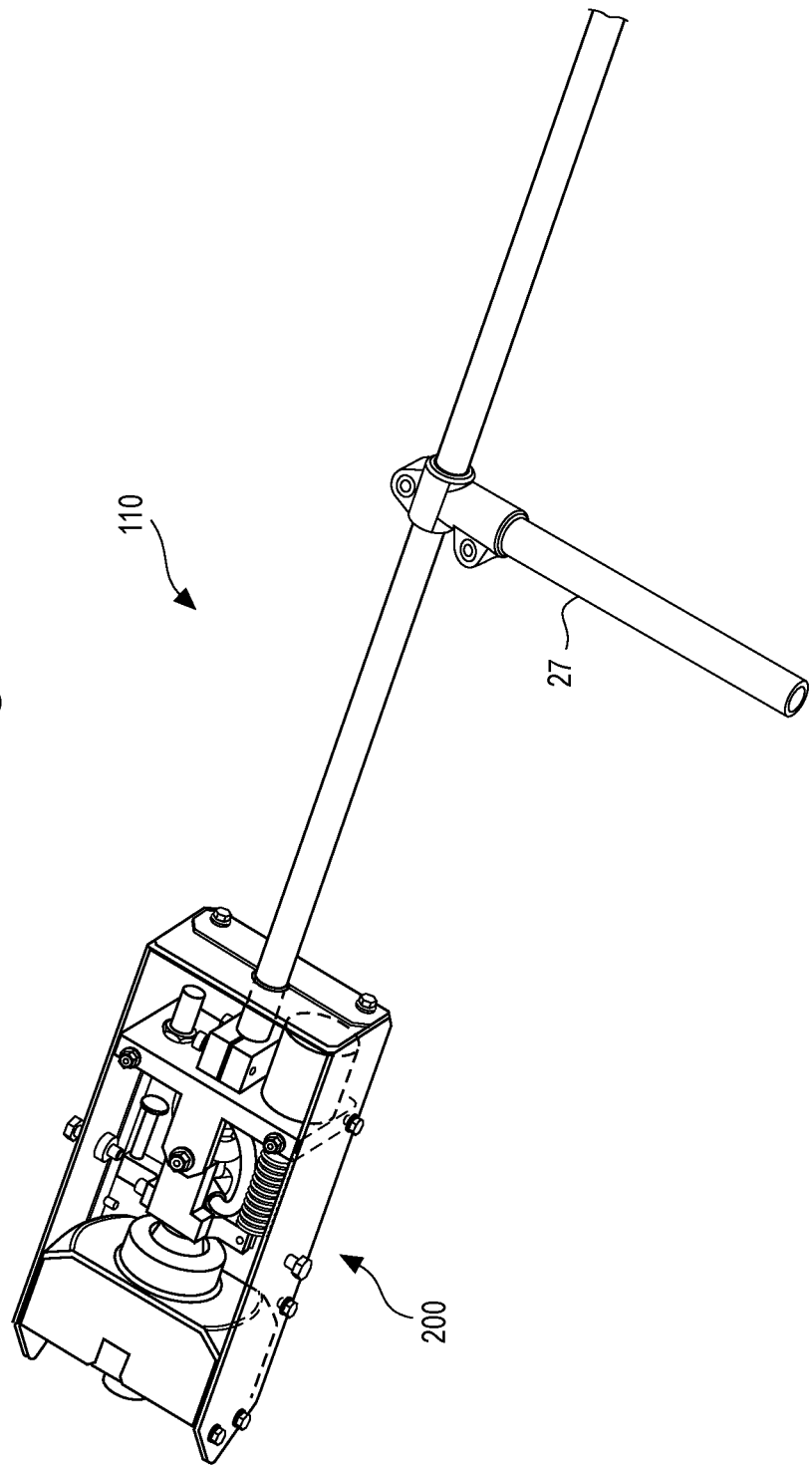

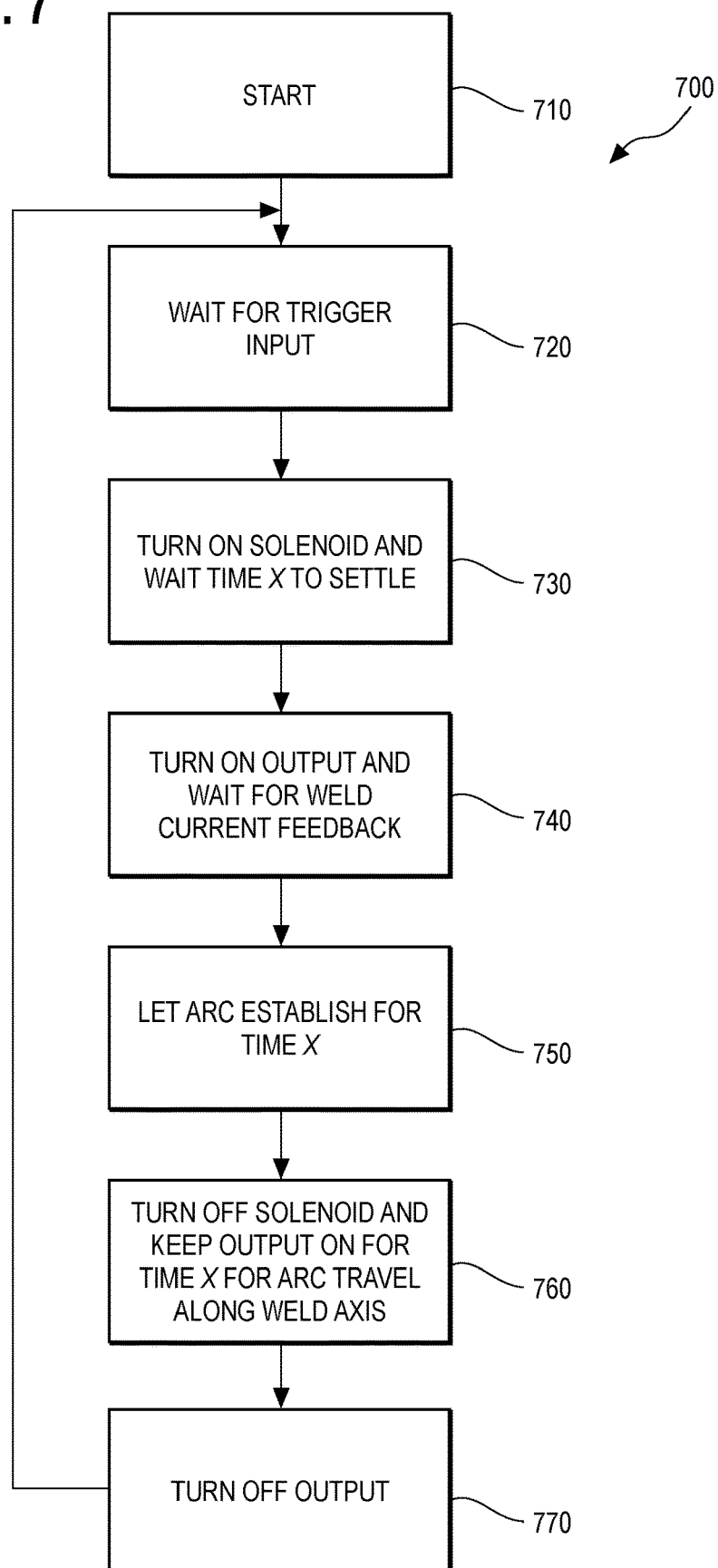

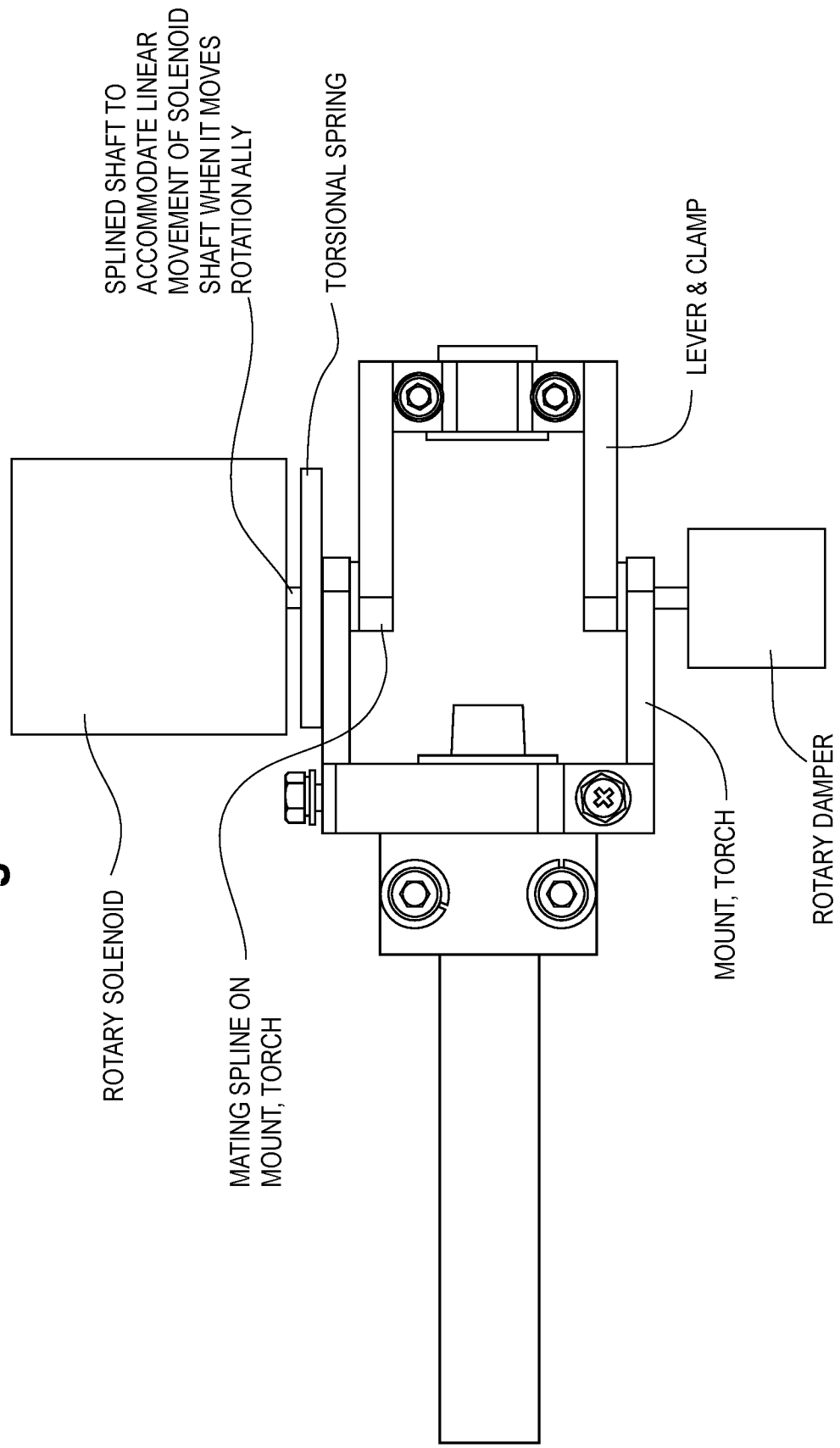

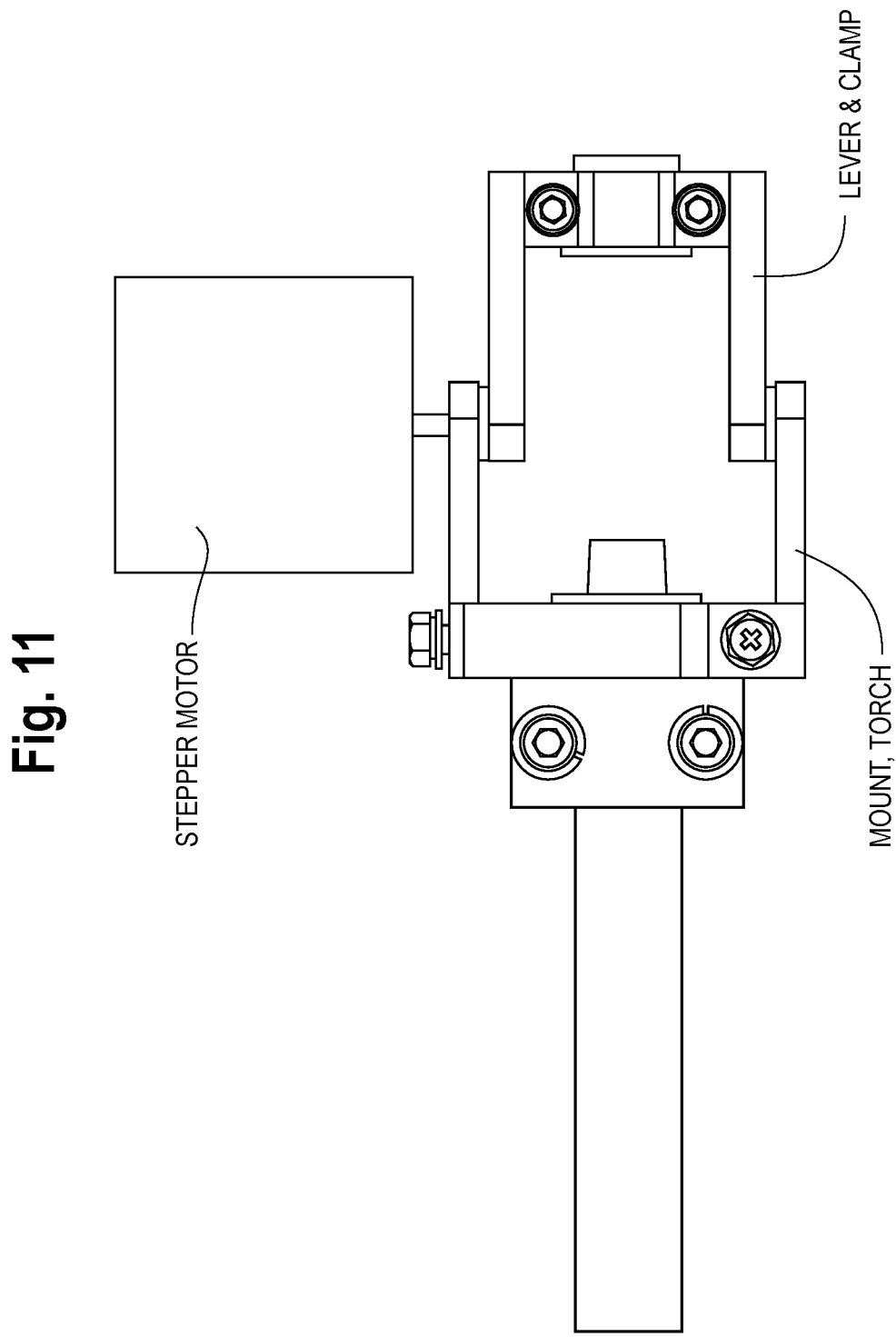

HYBRID MANUAL AND AUTOMATED WELDING

RELATED APPLICATIONS

The present application claims priority to and benefit from U.S. Application No. 62/211,685, filed Aug. 28, 2015. The above-identified application is hereby incorporated herein by reference in its entirety.

BACKGROUND

Welding operation can be classified as manual welding, semi-automatic welding, and automated welding. Most welding is still performed without automation. Semi-automatic welding conventionally describes the automation of consumable feeding or the motorized feeding of consumable electrodes in gas metal arc welding (GMAW) and flux-cored arc welding (FCAW) processes. Nevertheless, the movement of the arc or electrode is still performed by a human weld operator and is therefore dependent on the skills of the human weld operator. American Welding Society estimates there will be a shortage of 290,000 welding professionals by 2020 and, in particular, a shortage of skilled welders. Such trends are not limited to the United States and do not bode well for the production of quality welds in the future to meet the growing fabrication demand.

Automated welding, either robotic or fixed/hard automation, has been a viable solution to remove human weld operator from the delicate task of holding the weld tool with proper orientation with respect to joint and travel direction, and moving the weld tool along the weld seam at proper speeds. Typically, a welding robot motion has two types, air moves and the welding itself. The air moves are intended to move the weld tool from one weld position to another without actual welding. The weld moves are intended to perform welding operation itself with the weld tool held by the robot. It is extremely effective in high-volume, low-mix repetitive autonomous welding tasks in a confined work cell completely isolated from human for safety. However, automation solutions have been costly, are intimidating to new users, and require a robot technician to maintain and program. Further, automation solutions are difficult to weld in confined spaces, joints, and weld large workpieces such as buildings, bridges or ships. They are difficult to adapt to part fit-up variations, and often do not replace the weld operator, but rather only substitute the weld operator with a robot operator.

Due to the shortage of skilled welders, skilled welders are usually reserved for structurally critical welds at a shipyard or construction site. Weldments are normally tack welded together before a structural weld is put in. Tack welds are temporary short welds that hold the components of a weldment in place before the structural weld is applied. Since the tack weld might not have to pass the rigor of a weld inspection of the finished weld, temporary workers without weld qualification (e.g., shipyard labor such as painters, electricians, outfitters, plumbers, etc.) may be employed instead of skilled welders to perform tack welds. However, poor tack weld quality can contribute to weld defects in the final structural weld.

Further, tack welding can be ergonomically taxing on the human operator. For example, thousands of small tack welds must be placed in ship panel stiffeners during a work day in which the human operator must bend over or kneel down to perform the tack weld. Such ergonomic issues can also affect tack weld quality as fatigue sets in.

Besides tack welds, many structures are made solely by short stitch welds (also known as a series of stringer beads or skip welds) that are sufficient to carry the load and maintain structural integrity. Designers use short segmented stitch welds in lieu of a continuous long seam weld to reduce total heat input to the weldment, thereby reducing distortion, heat affected zone, residual stress, and burn-through, and realizing weld consumable savings. Stitch welding is sometimes used to arrest the zipper effect in crack propagation. In addition, structures such as bicycle frames are made with short tube-to-tube welds.

Those who perform occasional welding such as hobbyists, farmers, and repair shop workers need an easy way to make welds without the lengthy training typically required to become an expert in manipulating the welding torch.

BRIEF SUMMARY

Methods and systems are provided for motion assistance with a point-and-shoot welding torch substantially as illustrated by and/or described in connection with at least one of the figures, as set forth more completely in the claims.

Some embodiments of the present disclosure provide a low cost automation that automates not only the welding operation itself, but also leaves the "air moves" or the weld tool motion between weld locations to the manual operation of the human operator. The hand-held weld tool can perform welding itself without the operator even moving the tool. The hand-held weld tool can moved manually by the operator from one weld location to another. Some embodiments of the present disclosure provide an operator aid for making welding torch movements with respect to the joint to make a sound weld that is substantially independent of human operator skills in making temporary tack welds and short length finished welds. The welding torch movements can take into account, for example, wire placement (or aiming), a torch angle (e.g., with respect to a plane perpendicular to the weld axis, also known as a work angle), a travel angle (e.g., with respect to travel direction), and a torch speed. Advanced torch movements can include, for example, torch weaving patterns, back step motion, and other operator techniques used in all position welding or special joint configuration.

Some embodiments of the present disclosure provide a human operator aid for making an arc start. Human operators generally must feel the start location, offset the wire from the work piece without touching it, and strike the arc at the right place by a delicate movement. An inexperienced operator might flinch or be blinded when the arc comes on, thereby pulling back the gun and drawing a long arc and causing porosity (or holes) in the weld. Some embodiments of the present disclosure provide an aid for the positioning (or aiming) of the welding gun at an arc start such as, for example, holding down a gun torch and feeling the snug fit before triggering.

Some embodiments of the present disclosure improve the ergonomics of performing tack welds, for example, by performing tack welds in a natural standing position.

Some embodiments provide a hand-held welding tool that robotically or automatically performs welding, but is manually moved by human to place welds in various locations on a workpiece. Multiple operators can hold the tool and collaboratively weld on the same workpiece (e.g., a large ship panel) which is not possible with a fenced-in robot, for example. This "selective automation" sits in between full automated welding and manual welding where the weld motion itself is automated but the weld-to-weld motion without the heat source remains manual. It provides a cost-effective and flexible automation than traditional or fenced-in robot/automation, but the consistency, speed and quality surpassing manual welding and independent of human skill.

BRIEF DESCRIPTION OF THE DRAWINGS

FIG. 2 shows an embodiment of a tool head above the pistol grip handle and a tubular handle of the point-and-shoot weld tool according to the present disclosure.

FIG. 7 shows a flow chart of an embodiment of a point-and-shoot logic sequence according to the present disclosure.

FIG. 10 shows an embodiment of an assembly that can provide a side-to-side motion according to the present disclosure.

FIG. 11 shows an embodiment of an assembly that can provide control of a side-to-side motion according to the present disclosure.

DETAILED DESCRIPTION

Figure 1A:
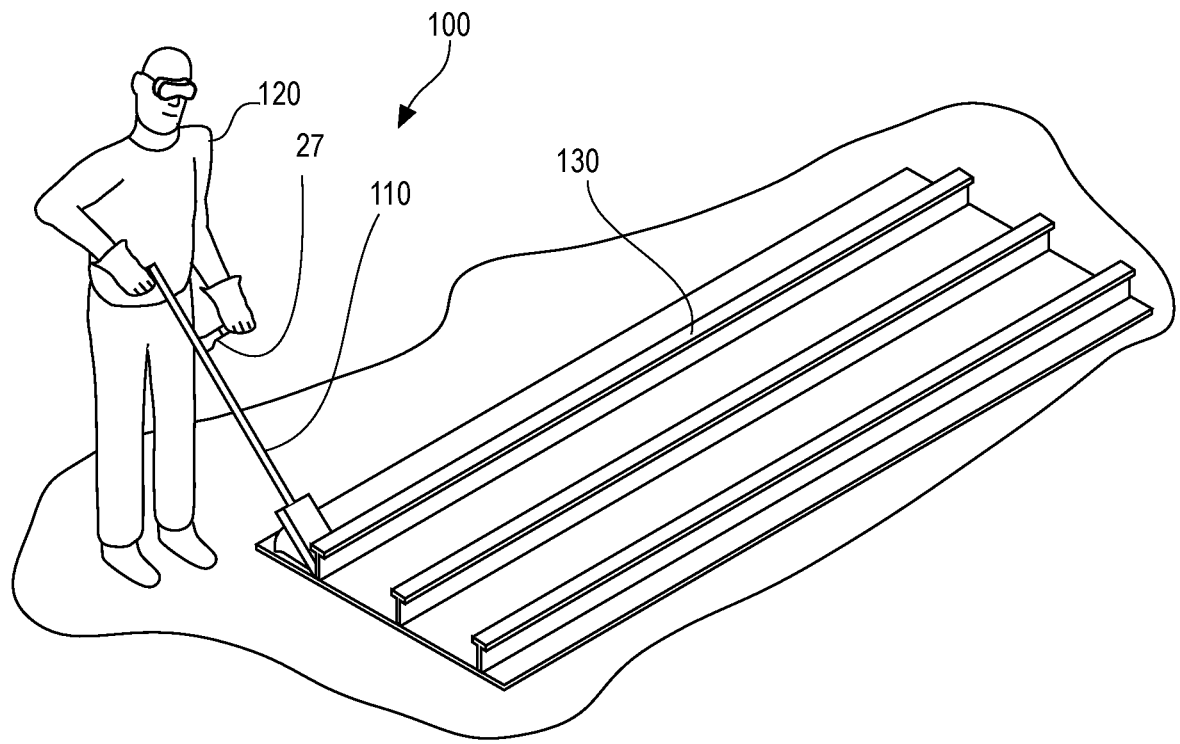
FIGS. 1A and 1B show an embodiment of the motion-assist, point-and-shoot weld torch system from different perspectives according to the present disclosure.

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration.

As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Some embodiments of the motion-assist, point-and-shoot weld torch system provide an improvement in the degree of automation in the "semi-automatic" classification of welding operation. The motion-assist, point-and-shoot weld torch system seeks to bridge the gap between full automation in which the human is completely taken out of the weld tool/torch movement and wire-feed automation or limited automation. In many applications such as, for example, welding a very large structure such as a ship fragment or the construction of a building or a bridge, it is not economical or feasible to use full automation. Some embodiments of the motion-assist, point-and-shoot weld torch system provide for automating the movement of welding wire, arc, and/or contact tip with respect to the joint and/or seam for a short length weld.

In some embodiments, the motion-assist, point-and-shoot weld torch system can be classified as an operator "motion assist" to distinguish it from full automation or semi-automatic welding, which implies automating only the wire feed. More specifically, the term "motion" refers to motion during arc on time. The motion during active welding (with arc lit) is automated, while the motion of the torch between each weld (from weld to weld) is manual (by hand). In robot welding, the motion from weld to weld is called "air moves" (e.g., the robot arm is moving in the "air" without an arc.) Some embodiments of the motion-assist, point-and-shoot weld torch system are intended as a low cost, dedicated automation torch movement.

Figure 1B:
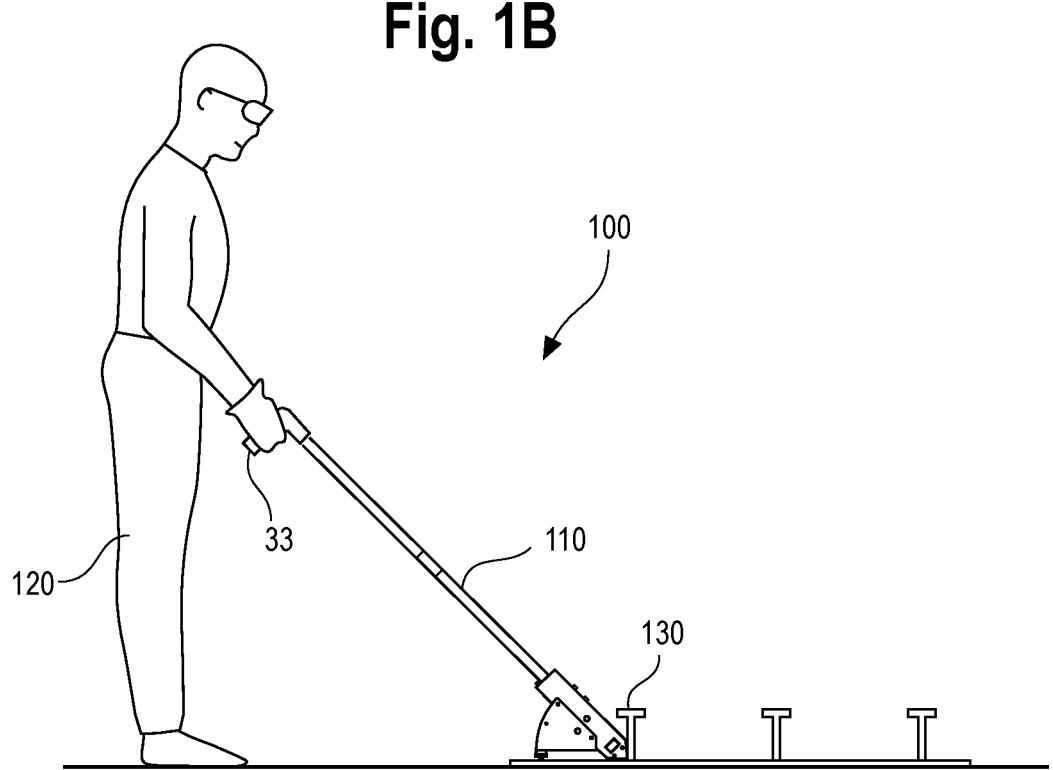

FIGS. 1A and 1B show an embodiment of the motion-assist, point-and-shoot weld torch system according to the present disclosure from two different perspectives. Referring to FIGS. 1A and 1B, the motion-assist, point-and-shoot weld torch system 100 includes, for example, a point-and-shoot weld tool 110. Although not shown, the tool 110 is connected to a power source and/or a feeder, if necessary. Further, the tool 110 may be a motion-assist, point-and-shoot weld GMAW torch for use with short length welds, for example. However, the tool 110 can be used with other welding processes (e.g., FCAW, GTAW, PAW, SAW, laser, etc.).

FIGS. 1A and 1B also show the tool 110 being held in in one hand of the human weld operator 120 at a pistol grip handle 33. Although not shown, the other hand of the human weld operator 120 can hold on to the tool 110 at a handle 27 (e.g., a tubular handle). In FIGS. 1A and 1B, the tool 110 is manually positioned to engage a workpiece. In particular, the tool 110 is manually positioned against a ship panel stiffener 130 of a workpiece. The tool 110 has a front end that fits into a particular joint (e.g., a matching fillet joint in FIGS. 1A and 1B). Upon a press of a button, a pulling of a trigger, or an activation of a switch, for example, at the pistol grip handle 33 (or some other manual operator event), a welding heat source is started from an initial position. The tool 110 automatically causes the welding heat source and/or a contact tip 40 to move and/or to swing, resulting in the wire and/or the arc being moved in a controlled manner with respect to the workpiece, thereby making a linear or non-linear weld, for example. In some embodiments, the tool 110 includes, for example, one or more motion devices or mechanisms that are configured to move transmissive optics and/or reflective optics coupled to an optical source (e.g., a laser) with respect to the workpiece during welding. In some embodiments, the transmissive optics and/or reflective optics are moved to guide a laser beam with respect to the workpiece. The motion can be, for example, a superimposed weave motion on a motion along a weld length during welding. In some embodiments, the welding arc is moved by an electromagnet, for example. In some embodiments, no moving parts are used to control the welding arc. In some embodiments, the weld length can be a short weld between approximately 5 mm to approximately 100 mm, for example. In some embodiments, the weld is a short weld with curvature (e.g., tube-to-tube weld, circular weld, etc.). In some embodiments, the motion of the contact tip 40 and/or the welding heat source includes linear or substantially linear motion. In some embodiments, the motion of the contact tip 40 and/or the welding heat source includes single-axis or multiple-axes motion. In some embodiments, upon the pressing of the button again (or letting go of the button or trigger or switch), for example, at the pistol grip handle 33, or some other manual operator event or condition (e.g., alarm, alert, weld completion, time out, etc.), the welding heat source and/or the contact tip 40 can be returned back to the initial position.

FIGS. 1A and 1B show an embodiment of the tool 110 similar to a weed whacker in which the weld operator operates the tool 110 in a standing position. In some embodiments, the tool 110 can come in a form factor similar to a hand drill with a handle 32, 33 configured so that the tool 110 may be moved around for short section welds above the floor level. The tool 110 can be outfitted with a bracket and a set of rollers, wheels and/or ball transfers on the bottom of the bracket that allow the tool 110 to be moved around easily. In some embodiments, the rollers, wheels and/or ball transfers allow the tool 110 to roll on the workpiece without lifting the tool 110 during or not during welding. In some embodiments, the rollers, wheels and/or ball transfers are motorized or powered so that the tool 110 can be self-propelled to move along the workpiece.

In some embodiments, the tool 110 can include, for example, position and/or pressure sensors to ensure engagement of the tool 110 with the fillet joint. The sensors can also be used to enable or disable the button, switch, or trigger, for example. In some embodiments, the sensors can be configured to detect disengagement of the tool 110 from the workpiece during welding and to shut down the welding heat source upon detection. In some embodiments, the tool 110 includes a built-in electromagnet or a mechanically actuated magnet to secure or release engagement of the tool 110 with the workpiece in response to the button, switch, or trigger or some other manual operator event. In some embodiments, the tool 110 includes one or more sensors or cameras that are configured to provide automated weld inspection post welding or a joint fit-up inspection prior to welding or lock-out. In some embodiments, the tool 110 can include one or temperature sensors that provide an indication of an initial temperature of the workpiece prior to welding. The indication of the initial temperature can be checked against a particular preheat temperature, and a lock-out can be triggered if a temperature criteria is not met.

In some embodiments, the tool 110 can include, for example, a protective guard or enclosure to shield the operator 120 from various hazards such as, for example, the arc, spatter, splatter, laser radiation, radiated heat, etc.

Although illustrated as one tool 110 per workpiece, the present disclosure also contemplates that multiple operators can simultaneously employ multiple tools 110 on a single workpiece.

Figure 3:
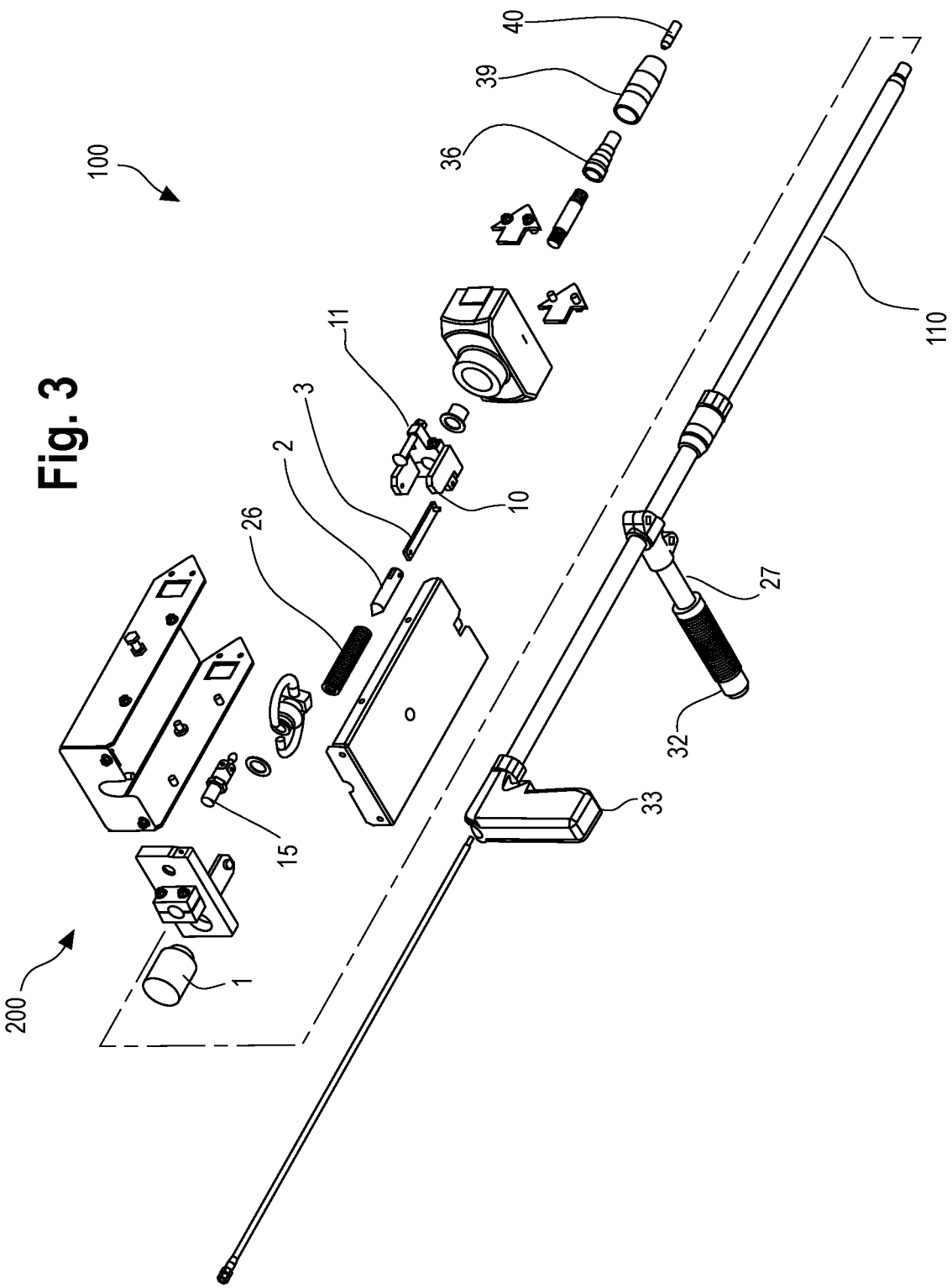
FIG. 3 shows an exploded view of an embodiment of the tool according to the present disclosure.

FIG. 2 shows an embodiment of the tool head above the pistol grip handle and the tubular handle according to the present disclosure. FIG. 3 shows an exploded view of an embodiment of the tool according to the present disclosure.

Referring to FIGS. 2 and 3, the tool 110 includes a solenoid assembly that includes a solenoid body 1, a solenoid plunger 2, and a solenoid link 3. The solenoid assembly is configured to pull in one direction during operation, thereby causing the contact tip to swing and/or to move to one side (see, e.g., FIG. 5).

The tool 110 also includes one or more handles 33, 27 by which the weld operator 120 can hold the tool 110. Some embodiments contemplate using one or two handles 33, 27. In some embodiments, one of the handles can be in the form of pistol grip handle 33. The pistol grip handle 33 can be located at the tool head and can have a trigger, switch, or button that can be used to commence the automated welding process. The second handle can be in the form of tube handle 27 with a rubber grip 32 and can be perpendicular to the longitudinal axis of the tool 110.

The tool 110 also includes a diffuser 36 (e.g., a gas diffuser) and a contact tip assembly. The contact tip assembly includes a nozzle assembly 39 and a contact tip 40. The contact tip assembly is mounted in a pivot (e.g., lever/clamp 10, 11). The pivot 10, 11 is configured to swing back and forth, thereby making an arc movement.

The tool 110 can also include a spring 26 and a motion dampener 15. In some embodiments, the travel speed can be controlled or set by the spring 26 and the motion dampener 15.

Figure 4A:
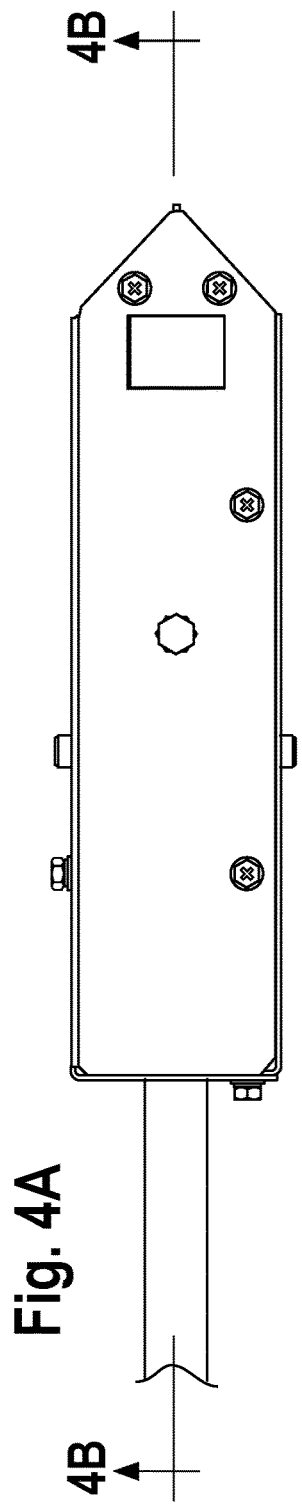
FIGS. 4A, 4B, and 4C show different cross sections of an embodiment of the tool in a center position of a weld according to the present disclosure.
Figure 4B:
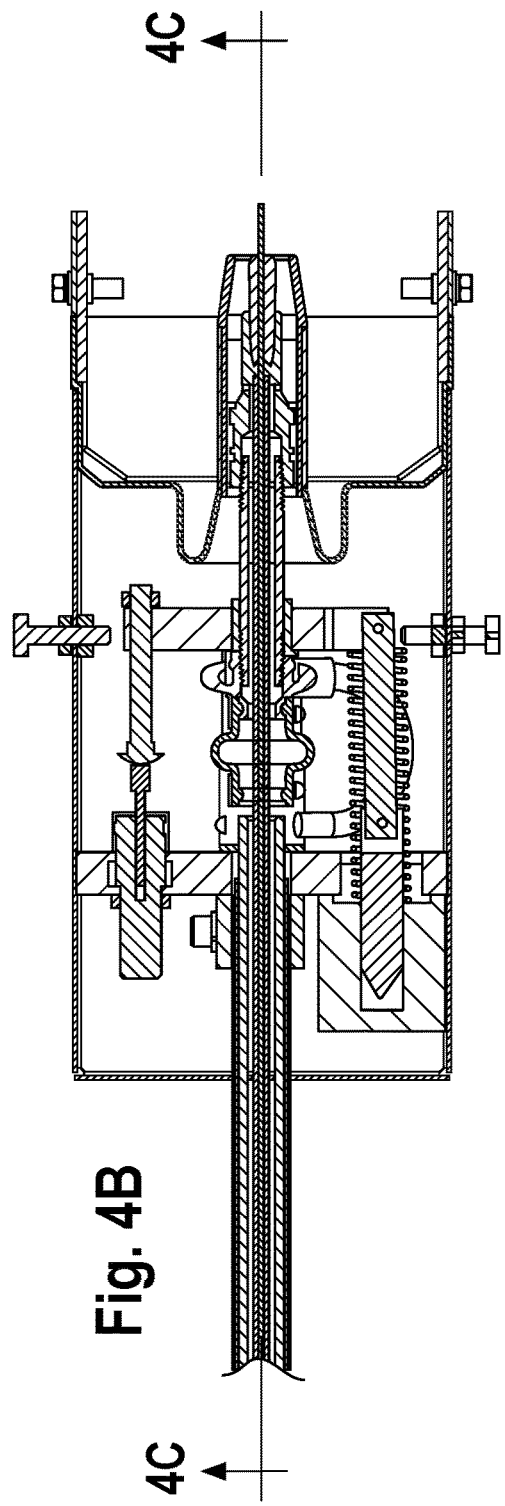
Figure 4C:
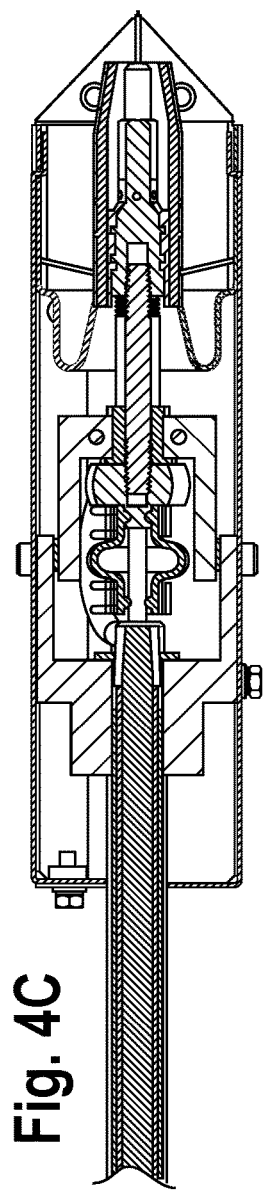
Figure 5:
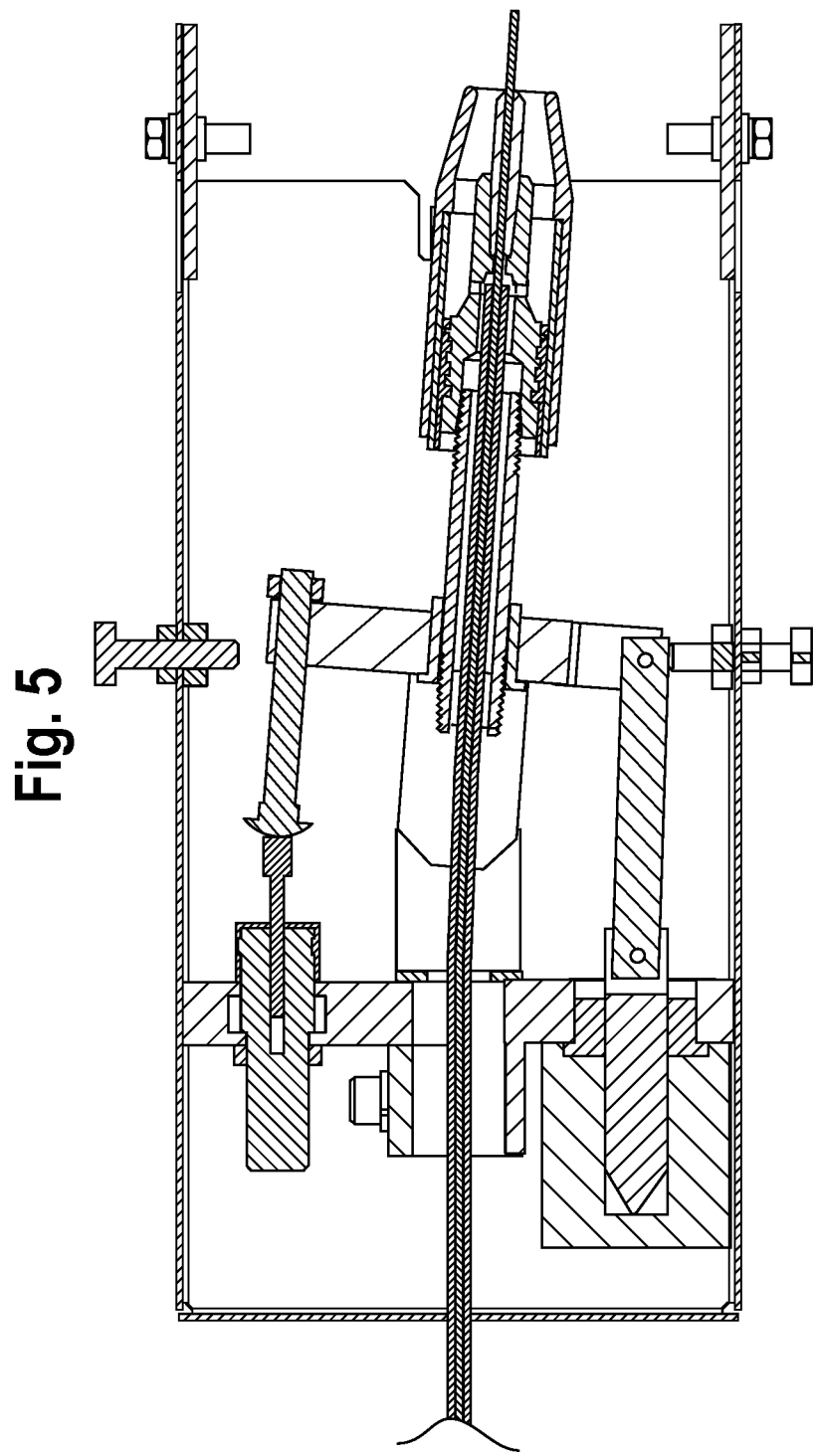
FIG. 5 shows a cross section of an embodiment of the tool when the solenoid is energized or engaged according to the present disclosure.
Figure 6:
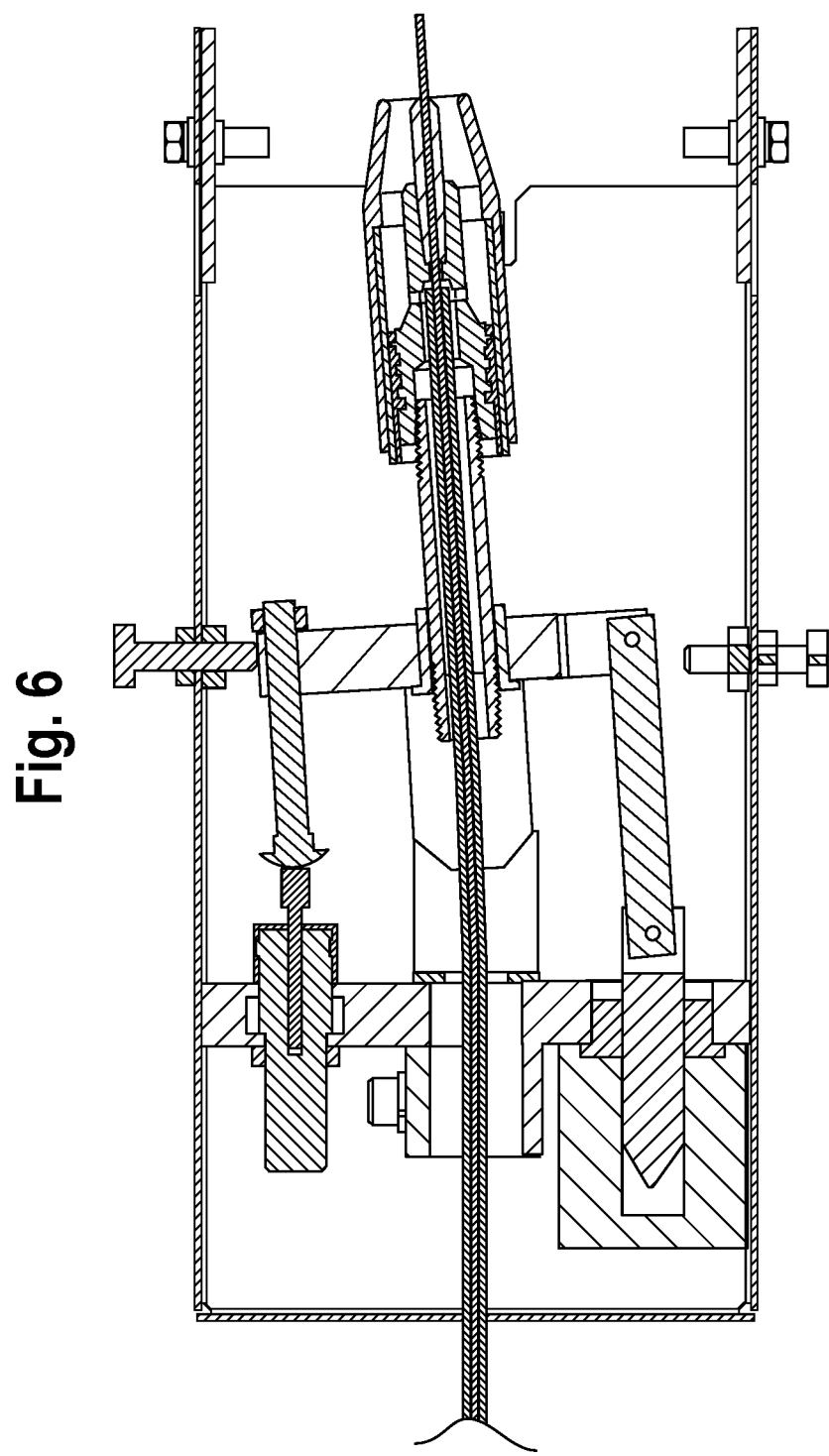
FIG. 6 shows a cross section of an embodiment of the tool when the solenoid is de-energized or released according to the present disclosure.

In operation, the tool 110 is placed in position such as, for example, the front end of the tool 110 is fit into a particular joint (e.g., a matching fillet joint of FIGS. 1A and 1B). FIGS. 4A, 4B, and 4C show cross sections of an embodiment of the tool 110 in a center position of the weld. The welding process can be triggered by the actuation of a trigger, a switch, or a button, for example, or by a condition being met. In some embodiments, the trigger is part of the pistol grip 33. The trigger can also be configured with a manual lock. Referring to FIG. 5, the solenoid assembly 1, 2, 3 is energized and pulls on one end of the assembly. The energized solenoid compresses the spring 26. This pulling causes the contact tip 40 to swing to one side so that the contact tip 40 is in the starting weld position. Referring to FIG. 6, the arc is initiated and then the solenoid assembly 1, 2, 3 is de-energized. The spring force causes contact tip 40 to swing back to the home position prior to the trigger pull. As the contact tip 40 swings to the other side, the contact tip 40 will move the wire and the arc to the other side making a linear weld in the process. When the contact tip 40 reaches the other side, it is in the ending weld position.

Some embodiments also provide that the power source (not shown) can be programmed or configured to output a waveform sequence for the entire weld corresponding to the small variation in electrode extension and the travel angle due to the arc motion (or imperfect linear motion). In some embodiments, the power source (e.g., a welding power source) is configured to ramp current up and down in correspondence with a variable welding speed during welding. When the other end is reached, the power source turns off the power and the weld is complete. Some embodiments provide for stopping the arc before the end of the stroke (e.g., stop on the fly), or start the arc after the beginning the stroke (e.g., start on the fly). Some embodiments provide for continuing welding for a given short time with reduced wire speed at the end of the stroke and performing a "crater fill" routine to build up volume and make a more appealing weld finish. More specifically, some embodiments of a low cost implementation of a motion mechanism using a solenoid can introduce travel speed variation during welding. For example, the travel speed may be very high at the beginning of the motion stroke and then slows down at the end of the motion stroke. In order to produce same size welding, it is desirable to synchronize travel speed and wire feed speed, for example, which can be at a higher wire speed at the beginning of the motion stroke, for example, then gradually slows down to match the slowing travel speed. Corresponding welding current change can also take place to match the varying wire speed. Additionally, the contact-tip-to-work (CTWD) distance can also vary due to an "arc" motion as opposed to a pure linear motion, and constant voltage control can automatically compensate for this arc motion.

FIG. 7 shows a flow chart of an embodiment of a logic sequence in operation according to the present disclosure. The process 700 starts at step 710. In step 720, the process 700 waits for a trigger input. In step 730, once a trigger input is received, the solenoid assembly is turned on (e.g., energized or engaged) and the process waits a particular time X for the solenoid to settle. In step 740, the output of the tool 110 is turned on and the process 700 waits for weld current feedback. In step 750, the arc is established for a particular time X or a different time Y. In step 760, the solenoid assembly is turned off and the output of the tool 110 is kept on for time X for weld travel. Some embodiments use time Y or time Z which can be different from time X in step 760. Once the weld travel is complete, the output of the tool 110 is turned off in step 770. The process then can be repeated at step 720. In some embodiments, after step 770, the tool 110 can be moved manually to a new weld position by the operator before the start of step 720.

Some embodiments contemplate that one or more of the steps in FIG. 7 or described in the present application can be performed by one or more processors that are located in the tool 110 or are coupled to the tool 110. The processor executable instructions, processor executable code, and/or data can be stored in the one or more processors and/or in one or more non-transitory memories (e.g., flash drives, magnetic drives, ROM, RAM, hard drives, solid state drives, storage devices, disk drives, optical drives, optoelectronic drives, etc.). The one or more processors can be operatively coupled to the one or more non-transitory memories via one or more buses, for example. The one or more processors and the one or more non-transitory memories can be integrated on one or more integrated circuits or on a single integrated circuit chip, for example. Some embodiments contemplate that the steps in FIG. 7 or described in the patent application can be performed by hardware, software, firmware, or some combination thereof.

In some embodiments, step 760 loops back to step 730 so that the sequence of steps 730-760 can be repeated a few times for multi-pass welding before step 770. In some embodiments, step 770 loops back to step 730 so that each weld has arc on and off. In some embodiments, step 770 can be excluded from a loop so that a multi-pass weld can be done without extinguishing the arc in between layers of the weld. Another benefit of the multi-pass weld is that a 110V power supply, for example, suitable for smaller size welds can be used. This can make the tack welding system more conveniently powered by the ubiquitous 110V in the construction site rather than waiting for electrician to wire up 480V input power to the tack welding system.

In some embodiments, FIG. 7 or other embodiments of FIG. 7, as discussed above, can be modified by replacing time X with time Y in step 750 and by replacing time X with time Z in step 760.

In some embodiments, a bracket can be added to the tool 110 to ensure the work angle with respect to the joint. In some embodiments, a magnetometer (e.g., a three-dimensional magnetometer) and/or gyroscope can be added to the tool 110 to ensure work angle and to lock out the trigger, if necessary.

Figure 8A:
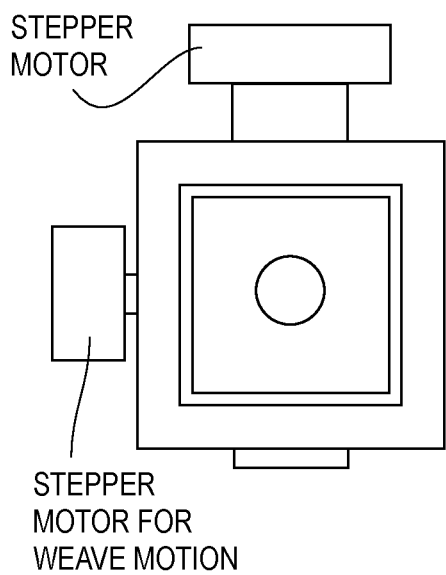
FIGS. 8A and 8B show an embodiment of an assembly that can provide an up-and-down weave in addition to the side-to-side motion according to the present disclosure.
Figure 8B:
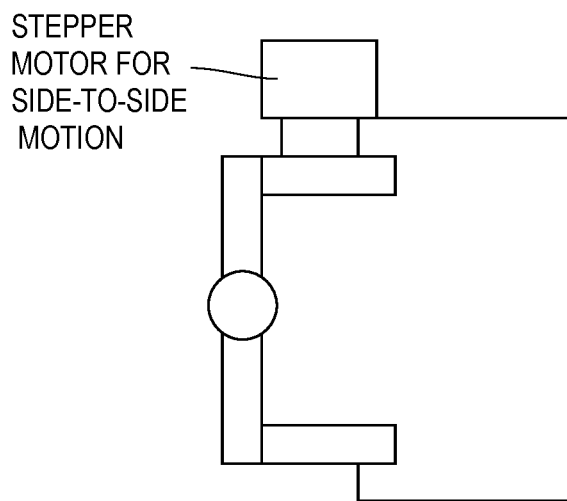
Figure 9A:
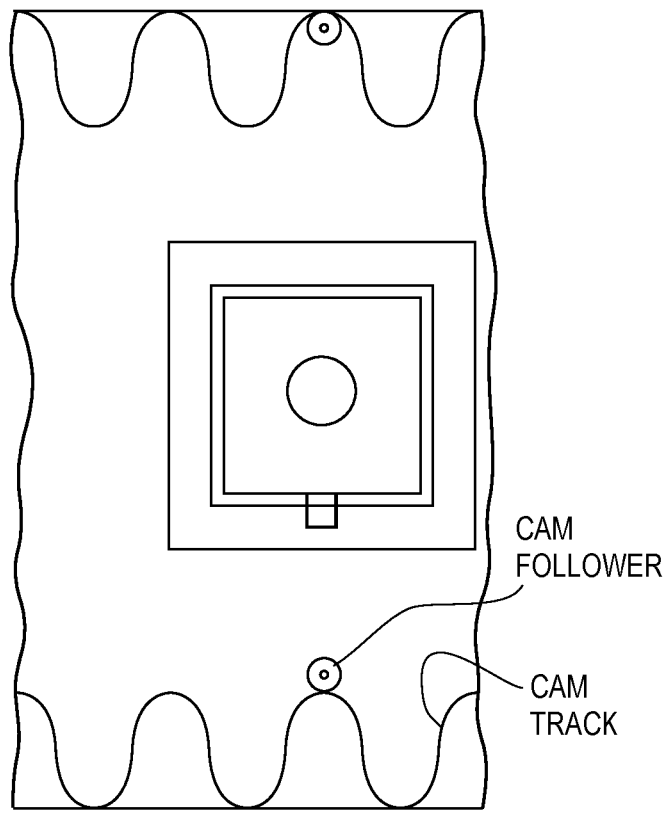
FIGS. 9A and 9B show an embodiment of an assembly that can provide an up-and-down weave in addition to the side-to-side motion according to the present disclosure.
Figure 9B:
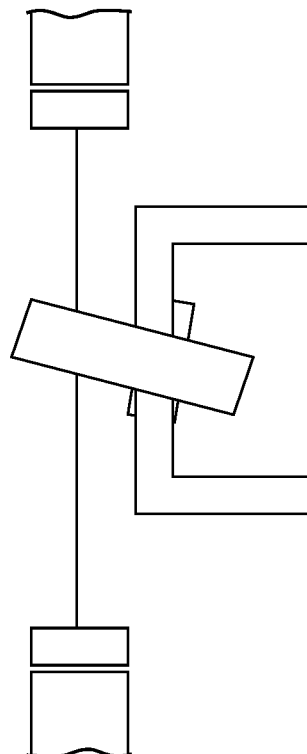

FIGS. 8A and 8B show an embodiment of an assembly that can provide an up-and-down weave in addition to the side-to-side swing motion so that a weave motion perpendicular to the weld axis can be incorporated into the motion along the weld axis. Referring to FIGS. 8A and 8B, a first stepper motor performs the side-to-side movement, and a second stepper motor performs the up-and-down weave. While some embodiments use stepper motors, other embodiments can use other methods or arrangements. For example, a sinusoidal support member for the swing arm to rest on can be used to create a pre-determined weave pattern that is perpendicular to the weld axis. FIGS. 9A and 9B show an embodiment of an implementation in which a cam follower is added to a sinusoidal track that performs the weave up-and-down motion as the stepper motor performs the side-to-side motion. In some embodiments, the stepper motor for the side-to-side motion can be replaced with a solenoid, spring, and damper assembly.

Some embodiments provide that the side-to-side motion is implemented with a rotary damper, spring, and solenoid (made by Ledex) as shown in FIG. 10. Generally these parts are more costly than a linear solenoid, but may be needed to meet performance or form factor requirements in a final product. The rotary solenoid is a linear solenoid with an internal track with ball followers that translate the linear motion to a rotary motion. There is, however, some linear motion that must occur so the pivot 10 would have to be splined or keyed to allow for this relative motion. This would be extra cost and can also be an additional drag point.

Some embodiments provide that the side-to-side motion can be controlled almost entirely by a stepper motor as shown in FIG. 11. This arrangement could replace the linear solenoid, spring, and damper, while also allowing the tailoring of the torch speed profile. The stepper motor is more expensive than the other devices but allows for a more compact design and better control.

Figure 12A:
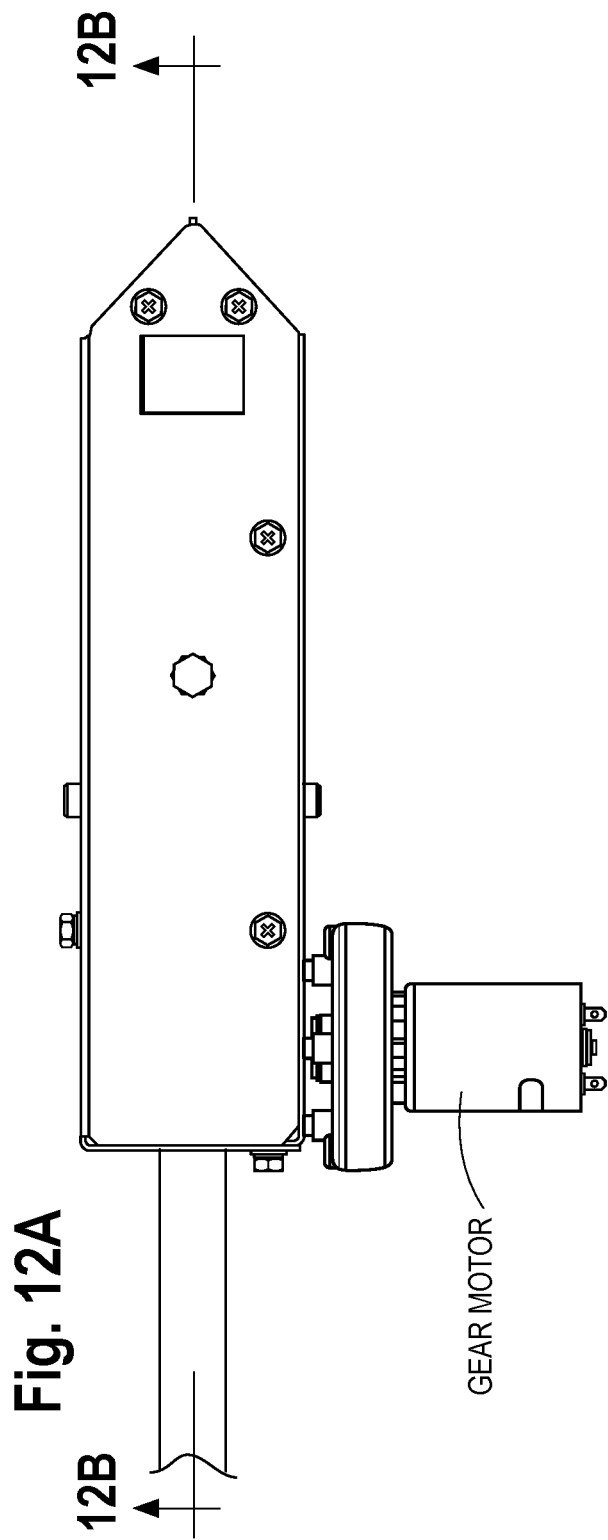
FIGS. 12A and 12B show an embodiment of an assembly that can provide control of a side-to-side motion according to the present disclosure.
Figure 12B:
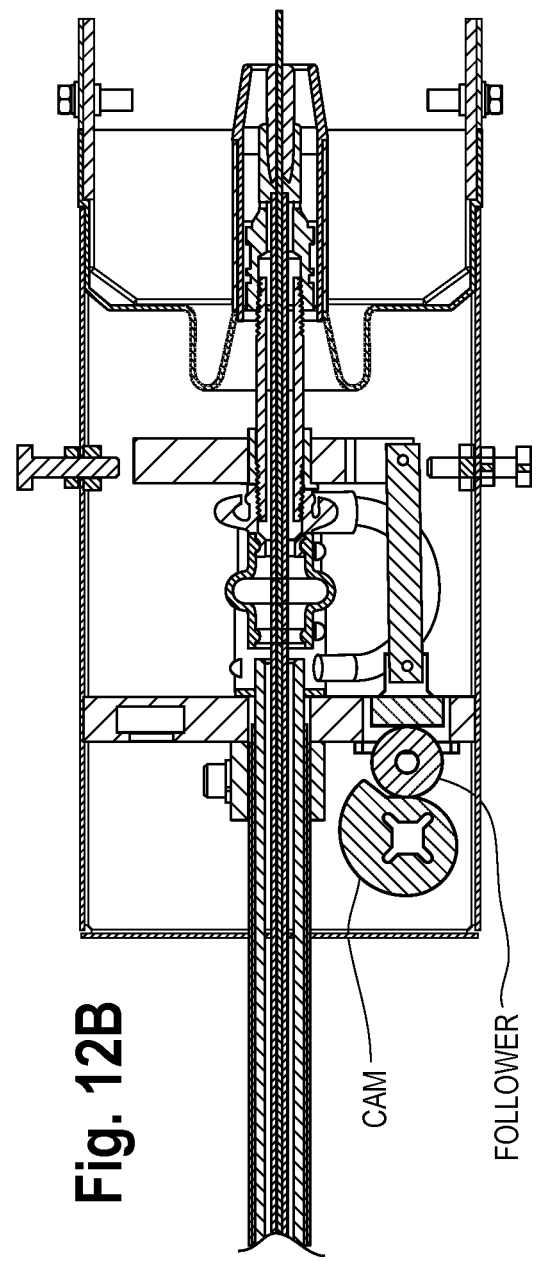

Some embodiments provide that the side-to-side motion can be controlled by the use of a gear motor with a cam and follower as shown in FIGS. 12A and 12B. This arrangement can be more cost effective than the linear solenoid due to the gear motor currently being used in a high volume wire feed application. The use of a cam allows for a more precise movement to be tailored. It can provide more of an active movement compared to the passive movement of the solenoid, spring and damper arrangement.

Figure 13:
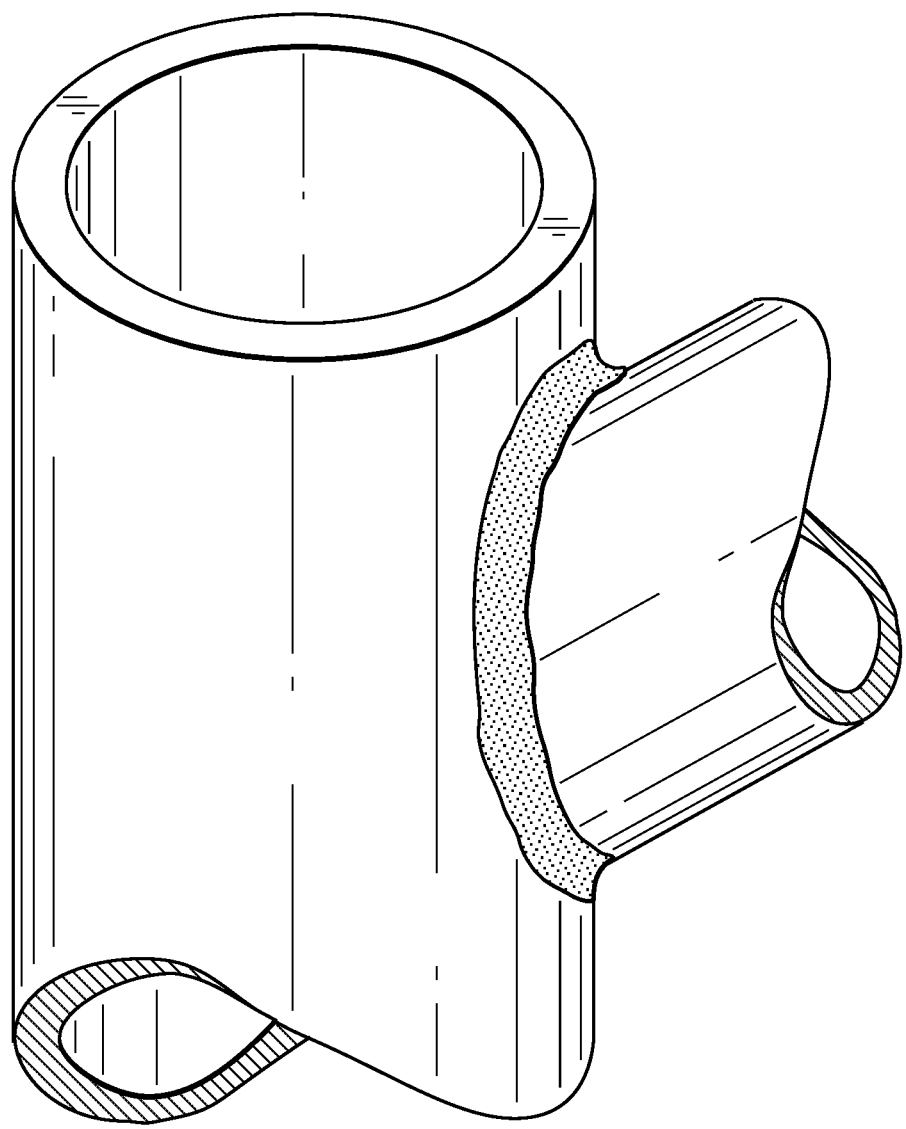
FIG. 13 shows an embodiment of tube-to-tube welding accomplished by the tool according to the present disclosure.

Some embodiments provide that the tool 110 can be configured to provide non-linear welds. For example, the shape of the tool 110 can be configured for tube-to-tube welding for bicycle frames, for example, as shown in FIG. 13. In some embodiments, the tool 110 can be modified to have a two-dimensional contoured move that matches with the desired tube-to-tube joint contour. The tool 110 can be configured to accommodate multiple "point and shoot" operations as needed to concatenate the short welds into a complete weld for tube-to-tube welding.

Various forms of the tool 110 may be designed for a myriad of joint applications. Some embodiments provide a hand tool 110 that automates the arc movement along the length of the weld so that the human operator only needs to hold down the tool against the work piece until the weld is complete.

Some embodiments of the tool 110 find application in arc welding with consumable electrode such as GMAW and FCAW. Some embodiments find application in non-consumable arc welding processes such as gas tungsten arc welding (GTAW) and plasma arc welding (PAW). Brazing with a metal inert gas (MIG) torch or cold wire tungsten inert gas (TIG) in which the wire feed and TIG torch are integrated and moved together are also contemplated by some embodiments. Some embodiments of the tool 110 find application in lower power laser welding.

Although the tool 110 is shown as a push-in tool 110 for a single, one shot, stationary fillet weld, some embodiments contemplate adding a roller, wheel, and/or ball transfer to the tool 110 for easy rolling to the next tack weld position. Some embodiments contemplate incorporating an encoder or a tachometer in the roller, wheel, and/or ball transfer so that the stitch weld can be automatically done repetitively with a prescribed gap between the welds, enforced by the distance the roller, wheel and/or ball transfer travels, and automatically triggered upon the arrival of the next weld position.

Although the fillet joint is shown in FIGS. 1A and 1B, some embodiments contemplate using the tool 110 for other joints such as, for example, butt welds, lap welds, tube-to-tube joints, etc. Some of these embodiments may benefit from a custom bracket (or wire frame) front end design matching with the joint. One such bracket is shown in FIGS. 1A and 1B with a set of rollers attached to it that allows movement of the tool 110 from weld to weld. Some embodiments contemplate using a wire frame that might let spatter and smoke escape from the weld head instead of trapping it. However, it does create more arc exposure than an enclosed head.

Some of drawings may show a particular design for a linear weld; however, the actual movement of the contact tip is an "arc" or radial movement. During this movement, several welding parameters are not constant as it would be in a true linear movement. For example, CTWD is going from long-to-short-to-long. Travel speed goes from fast to slow. Travel angle goes from pull to straight to push. However these variations are predictable based on the specific weld head design. It is possible that other non-motion related parameters can be pre-programmed or optimized to "match up" or compensate for the predictable variations in the motion, such as current, voltage, wire speed, etc.

In some embodiments, if a constant voltage GMAW waveform is used, welding current then can be used for detection gap and seam position. Welding parameters then can be adapted to handle gaps. Additional degree of motion freedom may be needed to track the seam. More sophisticated sensing may be included in the tool 110 for adaptive welding such as, for example, machine vision cameras or scanning lasers.

Some embodiments contemplate using the tool 110 as part of a "short length welding system," which might use more than just a torch. Some embodiments provide that a weld system package similar to a vacuum canister cleaner be used. In some embodiments, the welding power supply and the wire feeder can be in a canister on rollers, wheels, and/or ball transfers just like the vacuum canister, and the torch can be held in standup position like the vacuum stick. For 115V system, some embodiments provide for packaging the power supply and feeder in a backpack for the weld operator to wear. For the portability of a limited number of weld applications, some embodiments provide for the packaging of the equipment in a battery power system. Some embodiments contemplate providing a feeder portion in the torch with a small spool of wire or even a cartridge of stick electrodes or flux cored wire electrode lengths.

Some embodiments provide a more active control of the solenoid release by directly controlling the solenoid voltage. Rather than just on and off, the voltage signal can be modulated, for example. This would provide a more constant side-to-side motion than just the damper and spring can provide passively. It would better overcome any drag forces that may vary over the life of the torch. Using a sensing circuit, the solenoid position can also be determined by measuring the inductance or by using a pot or optical sensor. This would allow the weld operator to adjust the length of the weld with a selector knob, for example. Some embodiments provide that the weld length can be set by adjusting one or more screws 7 and nuts 24 in the housing 9 as shown in FIG. 3. These screws could also be replaced with a set of spring loaded detent indexed knobs as well.

Some embodiments provide for a motion-assist, point-and-shoot weld torch system that includes a handheld point-and-shoot torch in which a contact tip is moved from a first position to a second position which, in turn, causes a wire and an arc to move between two positions, thereby making a linear weld in the process. The contact tip can be moved by energizing and de-energizing a solenoid assembly. Some embodiments provide that the travel speed can be determined by a spring and a motion dampener in the torch.

Some embodiments of the motion-assist, point-and-shoot weld torch system provide that the skills of the human weld operator are substantially rendered irrelevant because the arc movement is automated. Low skilled workers (e.g., workers with little to no welding experience) can be used to perform tack welding with very little training.

Some embodiments of the motion-assist, point-and-shoot weld torch system provide high productivity through torch movement automation.

Some embodiment of the motion-assist, point-and-shoot weld torch system provide for a large distance between face and hands of the operator and the arc. This is beneficial since the exposure is reduced by the square of the distance. The health care costs can be reduced as well as OSHA claims or recordables. Further, face and eye protection can be enhanced.

Some embodiments of the motion-assist, point-and-shoot weld torch system provide improved ergonomics and comfort of the human welder in a stand up position, thereby improving the productivity and safety of the workplace. The health care and labor costs associated with knee and back strains can be avoided. Further, less safety apparel might be needed, thereby resulting in a cooler work environment.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, comprising:
   a housing, and
   a hand-held welding tool that is manually placed at a workpiece in a welding position by a handle attached to the housing,
   wherein the hand-held welding tool is at least partially enclosed in the housing and configured to be manually activated to cause a contact tip to automatically move within the housing about a fixed pivot point back and forth from a first weld position and to second weld position across an arc of less than 180 degrees during welding, wherein
   an actuator forces a spring to compress in the first weld position and releasing the spring to force the contact tip to move to the second weld position, and wherein the contact tip automatically moves independently with respect to a movement or no movement of the hand-held welding tool during welding.

2. The system of claim 1, wherein a welding current and a wire feed speed used during the welding are concurrently controlled.

3. The system of claim 2, comprising:
   a welding power source operatively coupled to the hand-held welding tool, wherein the welding power source is configured to ramp current up and down in correspondence with a variable travel speed during the welding.

4. The system of claim 1, wherein a travel speed is not constant during the welding.

5. The system of claim 1, wherein the hand-held welding tool is configured to provide a linear weld when the contact tip is automatically moved from the first weld position to the second weld position.

6. The system of claim 1, comprising:
   a solenoid assembly configured to control the contact tip and to position the contact tip in the first weld position when the solenoid assembly is energized.

7. The system of claim 6, wherein the solenoid assembly is configured to position the contact tip in the second weld position when the solenoid assembly is de-energized.

8. The system of claim 1, wherein the hand-held welding tool includes a second spring and a motion dampener, wherein the second spring and the motion dampener are configured to control a speed at which the contact tip automatically moves from the first weld position to the second weld position.

9. The system of claim 1, wherein the hand-held welding tool includes a trigger, a button, or a switch to manually activate the hand-held welding tool.

10. The system of claim 1, wherein the hand-held welding tool is configured such that the movement of the contact tip causes a wire and an output arc to automatically move along a path from the first weld position and to the second weld position along a workpiece.

11. The system of claim 1, wherein the hand-held welding tool is configured to produces tack welds.

12. The system of claim 1, wherein the hand-held welding tool is configured to cause the contact tip to automatically move from the first weld position to the second weld position in one or both of a side-to-side motion and an up-and-down motion.

13. The system of claim 1, further comprising:
    a first stepper motor to perform a side-to-side movement of the contact tip; and
    a second stepper motor to perform an up-and down weave movement of the contact tip.

14. The system of claim 13, further comprising a cam follower on a sinusoidal track to perform the weave up-and-down motion as the first stepper motor performs the side-to-side motion.

15. A method, comprising:
    manually positioning a hand-held welding tool to engage a workpiece by a handle attached to a housing;
    starting a weld from an initial position based on a first manual operator event;
    automatically or autonomously moving a welding heat source at least partially enclosed in the housing about a fixed pivot point back and forth from to a first position to a second position in an arc relative to the workpiece during welding, wherein the welding heat source automatically or autonomously moves within the housing independently with respect to a movement or no movement of the hand-held welding tool during welding; and
    applying power to the welding tool by constant voltage control to automatically compensate for variations in contact-tip-to-work (CTWD) distance as the welding heat source moves from the first position to the second position during welding.

16. A system, comprising:
    a housing, and
    a hand-held welding tool that is configured to be manually positioned to engage a workpiece by a handle attached to a housing and to start a weld from a first position based on a first manual operator event,
    wherein the hand-held welding tool is configured to automatically or autonomously move a welding heat source that is at least partially enclosed in the housing about a fixed pivot point back and forth along the weld from the first position to a second position in an arc of less than 180 degrees relative to the workpiece during welding, wherein an actuator forces a spring to compress in the first weld position and releasing the spring to force the welding heat source to move to the second weld position, wherein the welding heat source automatically or autonomously moves within the housing independently with respect to a movement or no movement of the hand-held welding tool during welding.

17. The system of claim 16, wherein the hand-held welding tool is configured to automatically return the welding heat source back to the first position.

18. The system of claim 16, wherein the first manual operator event includes a manual trigger operation, a manual switch operation, or a manual button operation.

19. The system of claim 16, wherein the hand-held welding tool is configured to be operated by an operator in a standing position and to be held by the operator during the welding.

20. The system of claim 16, wherein the hand-held welding tool is configured to produce a linear weld with a weld length of between approximately 5 mm to approximately 100 mm.

21. The system of claim 16, wherein the hand-held welding tool is configured to produce a short weld with a curvature.

22. The system of claim 16, wherein the hand-held welding tool is configured to produce a tube-to-tube weld or a circular weld.

23. The system of claim 16, wherein the hand-held welding tool is configured to perform one or more of the following: gas metal arc welding (GMAW), gas tungsten arc welding (GTAW), plasma arc welding (PAW), laser welding, and submerged arc welding (SAW).

24. The system of claim 16, wherein the hand-held welding tool is configured to engage a fillet joint using a position sensor or a pressure sensor to ensure engagement of the hand-held welding tool with the fillet joint.

25. The system of claim 24, wherein the hand-held welding tool is configured to enable or disable a trigger, a button, or a switch based the engagement of the hand-held welding tool with the fillet joint.

26. The system of claim 16, wherein hand-held welding tool includes a protective guard or enclosure that is configured to shield an operator from one or more of the following: an arc, spatter, splatter, laser radiation, and radiated heat.

27. The system of claim 16, wherein multiple hand-held welding tools can be operated simultaneously on the same workpiece.

28. The system of claim 16, wherein the automatic or autonomous motion includes single-axis motion that is linear or rotational.

29. The system of claim 16, wherein the automatic or autonomous motion includes multiple-axes motion.

30. The system of claim 16, wherein the hand-held welding tool includes sensors configured to detect disengagement of the hand-held welding tool from the workpiece during welding, and wherein the hand-held welding tool is configured to shut down the welding heat source based on the detection of the disengagement of the hand-held welding tool from the workpiece.

31. The system of claim 16, wherein the hand-held welding tool includes a built-in electromagnet or a mechanically actuated magnet that is configured to secure engagement of the hand-held welding tool with the workpiece in response to the first manual operator event.

32. The system of claim 16, wherein the hand-held welding tool has one or more ball transfers that provide for the hand-held welding tool to roll on the workpiece without lifting the hand-held welding tool.

33. The system of claim 32, wherein the one or more ball transfers are motorized or powered so that the hand-held welding tool is self-propelled to move along the workpiece.

34. The system of claim 16, wherein the hand-held welding tool includes one or more motion devices that are configured to move one of transmissive optics and reflective optics to direct a laser beam with respect to the workpiece.

35. The system of claim 34, wherein the one or more motion devices are configured to superimpose a weave motion on another motion along a weld length during the welding.

36. The system of claim 16, wherein the hand-held welding tool includes an electromagnet to move a welding arc.

37. The system of claim 16, wherein the hand-held welding tool includes one or more sensors or cameras that are configured to provide automated weld inspection post welding or a joint fit-up inspection prior to the welding or lock-out.

38. The system of claim 16, comprising one or more temperature sensors that provide an indication of an initial temperature of the workpiece prior to welding, wherein the indication of the initial temperature is checked against a particular preheat temperature, and wherein a lock-out is triggered if a temperature criteria is not met.

* * * * *